United States Patent [19]

Wu

[11] Patent Number: 4,820,767

[45] Date of Patent: Apr. 11, 1989

[54] PROCESS FOR THE PRODUCTION OF POLY(VINYL ACETATE) AND POLY(VINYL ALCOHOL)

[75] Inventor: Tse C. Wu, Morristown, N.J.

[73] Assignee: Allied-Signal Inc., Morris Township, N.J.

[21] Appl. No.: 674,400

[22] Filed: Nov. 23, 1984

[51] Int. Cl.$^4$ .............................................. C08F 8/00
[52] U.S. Cl. ................................. 525/62; 525/56; 526/218.1; 526/219; 526/319; 526/330
[58] Field of Search .............. 526/319, 218.1, 330, 526/219; 525/56, 62

[56] References Cited

U.S. PATENT DOCUMENTS

| | | | |
|---|---|---|---|
| 3,109,837 | 6/1960 | Lockheed et al. | 526/319 |
| 4,463,138 | 7/1984 | Wu et al. | 526/319 |
| 4,485,225 | 11/1984 | Satoh et al. | 526/319 |

FOREIGN PATENT DOCUMENTS

| | | | |
|---|---|---|---|
| 663529 | 5/1963 | Canada . | |
| 0712823 | 1/1980 | U.S.S.R. | 526/319 |
| 900571 | 7/1962 | United Kingdom . | |
| 2105354 | 3/1983 | United Kingdom . | |

Primary Examiner—Joseph L. Schofer
Assistant Examiner—J. M. Reddick
Attorney, Agent, or Firm—Richard C. Stewart; Gerhard H. Fuchs

[57] ABSTRACT

This invention relates to a process for the production of poly(vinyl alcohol) having a weight average molecular weight of at least about $0.4 \times 10^6$ by polymerizing vinyl acetate at a temperature of from about 0° C. to about 40° C. in the presence of an azo free radical polymerization initiator essentially in the absence of ultraviolet radiation to form an essentially linear poly(vinyl acetate) having a weight average molecular weight of at least about $1.0 \times 10^6$ and thereafter hydrolyzing the poly(vinyl acetate) to form the desired poly(vinyl alcohol).

19 Claims, No Drawings

PROCESS FOR THE PRODUCTION OF POLY(VINYL ACETATE) AND POLY(VINYL ALCOHOL)

DESCRIPTION

BACKGROUND OF THE INVENTION

1. Field of the Invention

This invention relates to the polymerization of vinyl acetate to from poly(vinyl acetate), and the production therefrom of poly(vinyl alcohol). More particularly, this invention relates to such a process for the production of poly(vinyl acetate) and poly(vinyl alcohol) of high molecular weight.

2. Prior Art

Poly(vinyl alcohol) is useful for many purposes. For example, poly(vinyl alcohol) of especially high viscosity is used as thickening agent, protective colloid and the like in which high viscosity solutions having low solid content are desired. Moreover, poly(vinyl alcohol) is used in textile and paper sizing, in adhesives, as an emulsion polymerization aid, and as an intermediate in the production of poly(vinyl butyral), the adhesive interlayer in laminated safety glass. Furthermore, poly(vinyl alcohol) is used for textile fiber after water-insolubilization.

High molecular weight poly(vinyl alcohol) is a high-melting, high-strength material which is suitable for a wide variety of applications including tire cord, housing materials, automotive plastics, super strength fibers, and the like. The excellent adhesive properties of poly(vinyl alcohol) render it potentially an outstanding tire cord material.

Poly(vinyl alcohol) is conventionally produced in a two-step process. In the first step of the process, vinyl acetate is polymerized to produce poly(vinyl acetate). In the second step, the poly(vinyl acetate) is subjected to alcoholysis (methanolysis or ethanolysis) in order to convert the poly(vinyl acetate) to poly(vinyl alcohol).

Several methods have been proposed for the manufacture of poly(vinyl alcohol) of relatively high molecular weight. For example, Canadian Pat. No. 663,529 discloses an emulsification process for producing poly(vinyl alcohol) in which a vinyl acetate emulsion is formed, and polymerization is initiated by irradiating the emulsion in the absence of oxygen with ionizing radiation to a total radiation dose in the range of $1.20 \times 10^4$ roentgens to $2.32 \times 10^4$ roentgens at a temperature of from 50° C. to −15° C. to form an essentially linear poly(vinyl acetate) having an intrinsic viscosity of 1.7 to 3.2 dL/g.

Based upon numerical calculation, the poly(vinyl acetate) of Canadian Pat. No. 663,529 has a viscosity average molecular weight ranging from about 640,00 to about 1,500,000. Alcoholysis of the poly(vinyl acetate) of Canadian Patent No. 663,529 would produce poly(vinyl alcohol) having a viscosity average molecular weight ranging from about 327,000 to about 765,000.

A similar radiation initiated bulk polymerization procedure is described in United Kingdom Pat. No. 900,571. In this patent, vinyl acetate is polymerized by subjecting it to ionizing radiation in the absence of oxygen or other reactive substances at a temperature below the temperature at which thermal polymerization of the vinyl acetate occurs. The resulting poly(vinyl acetate) is hydrolyzed to produce the desired poly(vinyl alcohol). United Kingdom Pat. No. 900,571 discloses that the poly(vinyl alcohol) produced by the process of that patent has the molecular structure:

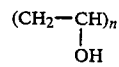

where n is the average degree of polymerization with n being 4,700. The poly(vinyl alcohol) of United Kingdom Pat. No. 900,571 has a viscosity average molecular weight of about 200,000, and the corresponding poly(vinyl acetate) of United Kingdom Pat. No. 900,571 has a viscosity average molecular weight of about 404,000.

Some investigators indicate that production of essentially linear poly(vinyl acetate) requires a polymerization temperature below about −15° C. Atkinson, et al., European Polymer Journal, Vol. 15. pp 21-26 (1979); Hobbs, et al., Journal of Polymer Science, Vol. XXII, pp. 123-135, 124 (1956); Burnett, et al., Journal of Polymer Science, Vol. XVI, pp. 31-44, 39 (1955). Hobbs, et al. disclose at page 125 the preparation of an essentially linear poly(vinyl acetate) having an intrinsic viscosity of 3.11. In order to produce this polymer, Hobbs, et al. employed azobisisobutyronitrile as an initiator at a concentration of $2.33 \times 10^{-4}$ moles per liter and allowed the polymerization to continue for 37.5 hours at a temperature of −19° C.

Burnett, et al. found that a polymerization temperature of −25° C. to −38° C. could be employed in order to obtain essentially linear poly(vinyl acetate). However, Burnett, et al. noted that polymers prepared at −38° C. had essentially the same molecular shape as those prepared at −25° C. A contrary view is that the polymerization temperature is irrelevant and that essentially linear poly(vinyl acetate) may be obtained as long as the polymerization is not allowed to proceed to high conversions of the monomeric vinyl acetate. Matsumoto, et al., Journal of Polymer Science, Vol. XLVI pp. 520-523 (1960).

U.S. Pat. No. 4,463,138 discloses that poly(vinyl acetate) can be produced by free radical bulk polymerization of vinyl acetate with controlled low initiator concentrations and with ultraviolet radiation to activate the initiator, employing a polymerization temperature of between about −25° C. and about −45° C. for a period of time between about 24 hours and 120 hours. This patent discloses that the poly(vinyl alcohol) can be prepared by conventional alcoholysis of the poly(vinyl acetate). Poly(vinyl alcohol) prepared in accordance with the process has an intrinsic viscosity greater than about 5 dL/g.

United Kingdom Pat. No. 2,105,354 discloses a process in which ethylene and vinyl acetate are continuously copolymerized in a solvent in the presence of a radical initiator whose half life measured at 60° C. is not longer than 2 hours, such as 2,2′-azobis-(4-methoxy-2,4-dimethylvaleronitrile), at a temperature in excess of 50° C. The patent states that use of such inhibitors reduces gel formation.

SUMMARY OF THE INVENTION

The present invention is directed to a bulk polymerization process of preparing essentially linear poly(vinyl acetate) of high molecular weight which can be subjected to alcoholysis to provide a high molecular weight poly(vinyl alcohol). More particularly, this invention provides an improved bulk polymerization process in which the polymerization of vinyl acetate is initiated by an "initiating effective amount" of an "effective initiatior", preferably an azo initiator having a half life of from about 500 to about 3 hours measured at a temperature of from about 0° C. to about 40° C. substantially in the absence of ultra-violet radiation. The process is carried out at a temperature of from about 0° C. to about 40° C. This invention also relates to high molecular weight essentially linear poly(vinyl acetate) and high molecular weight poly(vinyl alcohol) produced via alcoholysis of said poly(vinyl acetate).

In its simplest form, poly(vinyl acetate) may be represented as follows by structure I:

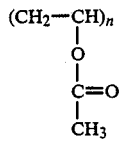  (I)

wherein n is the degree of polymerization (i.e. number of repeat units). Upon alcoholysis, structure I is converted to poly(vinyl alcohol) which may be represented as follows by structure II:

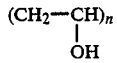  (II)

wherein n is as described for structure I.

It should be appreciated, however, that poly(vinyl acetate) having a structure corresponding to structure I is most difficult to obtain by bulk polymerization procedures. The difficulty is associated with the fact that during vinyl acetate polymerization, a hydrogen may be abstracted from the alpha, beta or methyl carbon of the acetate group to produce radical sites capable of combining with other vinyl acetate monomers to form a chain. Such combinations result in poly(vinyl acetate) which contains extended branches and, of course, is nonlinear. Branching at the alpha and beta carbons is known to occur much less frequently than branching at the methyl carbon of the acetate group, and such branching is not considered a major problem. However, branching at the methyl group of the acetate group is somewhat common under certain conditions and will/may lead to poly(vinyl acetate) having a significant number of branch points according to structure III which is as follows:

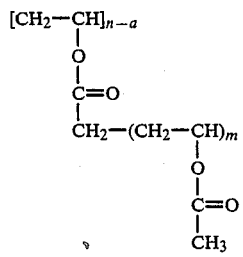  (III)

Even worse, the branching mechanism may continue further to produce branch points represented by structure IV as follows:

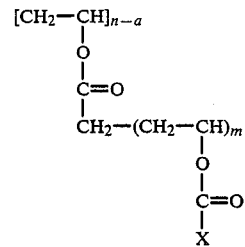  (IV)

wherein X is CH$_3$ (termination of branching) or —CH$_2$— (further branching) and m is an integer. In structures III, and IV above, n is as previously described hereinabove, and a is the number of unbranched repeat units.

The occurrence of substantial branching during vinyl acetate polymerization is most undesirable if one desires to convert the poly(vinyl acetate) to poly(vinyl alcohol). In order to appreciate the undesirability of substantial branching, one must first appreciate that upon alcoholysis of poly(vinyl acetate) for the production of poly(vinyl alcohol), the acetate groups are cleaved from the backbone of the polymer. Thus, the molecular weight of poly(vinyl alcohol) will necessarily be about one half that of poly(vinyl acetate) due to the molecular weight of the repeat units for each polymer. The molecular weight of a poly(vinyl acetate) repeat unit is about 86, while the repeat unit of poly(vinyl alcohol) has a molecular weight of about 44. However, if a significant number of the acetate groups have attained greater length (i.e. greater molecular weight) via a branching mechanism, the poly(vinyl alcohol) produced by alcoholysis of the significantly branched poly(vinyl acetate) will have a molecular weight significantly less than one half the molecular weight of the poly(vinyl acetate). Therefore, in order to produce high molecular weight poly(vinyl alcohol), it is necessary that the number of extended branches contained by the precursor polymer, poly(vinyl acetate), be minimized as much as possible.

While the process described in U.S. Pat. No. 4,463,138 minimizes the formation of extended branches to a significant extent, and provides excellent ultra-high molecular weight poly(vinyl alcohol) and poly(vinyl acetate), it does suffer from a number of inherent disadvantages. For example, the use of radiation and the lower reaction temperatures require the use of expensive equipment. Surprisingly, we have discovered that an essentially linear, high molecular weight poly(vinyl acetate) can be produced (which would be described in more detail below) by using certain initiators substantially without activation by ultraviolet light at certain temperatures. The poly(vinyl acetate) can be conventionally hydrolyzed using conventional procedures to provide high molecular weight poly(vinyl alcohol). The process of this invention not only eliminates the need for costly equipment, but also allows the polymerization to be carried out at or near ambient temperatures. Moreover, this process provides high molecular weight poly(vinyl alcohol) which can be conveniently used for applications where poly(vinyl alcohol) having high melting point and high strength are required.

DESCRIPTION OF THE PREFERRED EMBODIMENTS

The process of this invention consists of two essential steps. The first step of the process can be depicted schematically as follows:

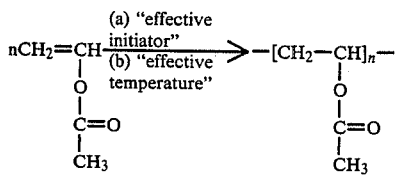

wherein n is an integer of from about 2500 to 25,000, preferably from about 9000 to about 23,000, and most preferably from about 11,000 to about 21,000. The first step of the process of this invention can be conveniently carried out by bulk polymerizing vinyl acetate in the presence of an "initiating effective amount" of an "effective initiator" at an "effective temperature" for a period sufficient to form the desired poly(vinyl acetate).

As used herein, an "effective initiator" is a free radical polymerization initiator which is capable of bulk polymerizing vinyl acetate at a temperature of from about 0° C. to about 40° C. to provide an essentially linear poly(vinyl acetate) having a weight average molecular weight equal to or greater than about 900,000, which on alcoholysis provides a poly(vinyl alcohol) having a weight average molecular weight equal to or greater than about 450,000. The weight average molecular weight is determined by the method described in W. S. Park, et al, Journal of Polymer Science, Polymer Physics Ed. vol. 15, p. 81 (1977). Usually, the effective initiator is an azo compound having a half life of up to about 200 h at a temperature of from about 0° C. to about 40° C. In the preferred embodiments of the invention, the initiator will have a half life of from about 1 to about 200 hours at a temperature of from about 0° C. to about 40° C., and in the particularly preferred embodiments of the invention, the initiator of choice will have a half life of from about 10 to about 150 hours at a temperature of from about 10° C. to about 35° C. Amongst these particularly preferred embodiments, most preferred are those embodiments in which the initiator has a half life of from about 50 to about 100 hours measured at a temperature of from about 15° C. to about 30° C. The half life of the initiator can be calculated from the decomposition rate of the initiator which is described in, for example, the "Polymer Handbook", J. Brandrup & E. H. Immergut, John Wiley & Sons. 1975. Illustrative of initiators suitable for use in the procedure of the invention are azo compounds of the formula:

wherein $R_1$ and $R_2$ are the same or different, and are independently straight or branched-chain lower alkyl, lower alkoxyalkyl, cycloalkyl, nitrile substituted alkyl groups, phenylalkylnitrile. The selection of suitable $R_1$ and $R_2$ groups is well within the skill of the art. Within the scope of the above formula preferred azo initiator are 2,2'-azobis-(2,4-dimethyl-4-methoxyvaleronitrile); 2,2'-azobis 2,4-dimethylvaleronitrile); 1,1'-azobis-1-cyclooctanenitrile; azobis-2-methylbutyronitrile; 1,1'-azobis-1-cyclohexanecarbonitrile; 2,2'-azobis-2-propylbutyronitrile; 2,2'-azobis-2-methylhexylonitrile; 2,2'-azobis-2-benzylpropionitrile and the like. Amongst these preferred initiators, 2,2'-azobis-(2,4-dimethyl-4-methoxyvaleronitrile) is most preferred.

There is a relationship between the amount initiator employed, the polymerization temperature and polymerization times. Each of the aforementioned process parameters are selected to maximize the molecular weight of the poly(vinyl acetate), and to minimize the degree of branching. In general, acceptable results are provided when the initiator concentration varies from about $1 \times 10^{-6}$ to about $1 \times 10^{-3}$ mole percent based on the total moles of vinyl acetate monomer, the polymerization temperature is from about 0° C. to about 40° C., and polymerization times are from about 2 to about 48 h. In the preferred embodiments of the invention, initiator concentrations will vary from about $1 \times 10^{-5}$ to about $1 \times 10^{-3}$ mole percent on the aforementioned basis, polymerization temperatures will vary from about 10° C. to about 35° C., and polymerization times will vary from about 4 to about 36 h. In the particularly preferred embodiments, initiator concentrations will vary from about $2 \times 10^{-5}$ to about $2 \times 10^{-4}$ mole percent on the aforementioned basis, polymerization temperatures will vary from about 15° C. to about 25° C., and polymerization times will vary from about 6 to about 24 h. Amongst these particularly preferred embodiments most preferred are those embodiments, in which initiator concentration is from about $5 \times 10^{-5}$ to about $5 \times 10^{-4}$ mole percent on the aforementioned basis, polymerization temperatures are in the range of from about 15° C. to about 25° C. and polymerization times are from about 6 to about 18 h.

In the process of this invention for the production of high molecular weight essentially linear poly(vinyl acetate) the starting material, the vinyl acetate monomer preferably has a purity equal to or greater than about 99% by weight and most preferably equal to or greater than about 99.9% by weight. Small scale quantities of vinyl acetate having a purity equal to or greater than about 99.9% by weight may be obtained by fractionating vinyl acetate monomer with a 200-plate spinning band column and collecting the middle boiling fraction to about 72.2° C. Large quantities of vinyl acetate having a purity equal to or greater than 99.9% by weight for industrial production of high molecular weight poly(vinyl alcohol) may be obtained by standard industrial distillation procedures which are well known to those having skill in the art.

Polymerization of the vinyl acetate monomer is accomplished by initiated radical polymerization. Oxygen acts as an inhibitor of radical polymerization and, accordingly the polymerization is preferably carried out under substantially oxygen free condition. Thus, the fractionated highly pure vinyl acetate monomer is preferredly subjected to deoxygenation procedures prior to polymerization. This may be accomplished by a freeze-thaw operation under a high vacuum and an inert gas sweep wherein the monomer is frozen at about −93° C., thawed, refrozen, thawed, etc. The vinyl acetate monomer should undergo at least about three freeze-thaw cycles in order to ensure an essentially complete removal of oxygen. However, removal of oxygen by bubbling pure nitrogen through the polymerization mixture is also adequate in this invention.

Once a purified and deoxygenated vinyl acetate monomer is obtained, the monomer may then be transferred to a suitable reactor for conducting the free radical bulk polymerization process of this invention. Reactors suitable for use in the polymerizing reaction are not critical, and reactors used in conventional bulk polymerizations can be used. Suitable reactors will usually be equipped with a temperature control means to maintain the reaction mixture within the desired temperature range, and should also be equipped with means to maintain the reactor substantially oxygen free; as for example, means for carrying out the polymerization under an inert gas such as nitrogen.

The process of this invention can be conducted in a batch, semicontinuous or continuous fashion. The reaction can be conducted in a single reaction zone or in a plurality of reaction zones, in series or in paralleled or it may be conducted intermittently or continuously in an elongated tubular zone or series of such zones. The materials of construction employed should be inert to the reactants during the reaction and the fabrication of the equipment should be able to withstand the reaction temperatures and pressure.

The reaction zone can be fitted with one or more internal and/or external heat exchanger(s) in order to control undue temperature fluctuations, or to prevent any possible "runaway" reaction temperatures or fluctuations therein. In preferred embodiments of the process, agitation means to vary the degree of mixing of the reaction mixture can be employed. Mixing by vibration, shaking, stirring, rotation, oscillation, ultrasonic vibration or the like are all illustrative of the type of agitation means contemplated. Such means are available and well known to those skilled in the art.

The reactants and reagents may be initially introduced into the reaction zone batchwise or may be continuously or intermittently introduced in such zone during the course of the process. Means to introduce and/or adjust the quantity of reactants introduced, either intermittently or continuously into the reaction zone during the course of the reaction, can be conveniently utilized in the process especially to maintain the desired molar ratio of the reaction solvent, reactants and reagents.

Upon completion of the polymerization process, unreacted vinyl acetate may be removed by distillation under atmospheric or sub-atmospheric pressures. A polymeric residue comprising poly(vinyl acetate) will remain in the vessel utilized for the removal of unreacted vinyl acetate. The poly(vinyl acetate) product may be worked up by conventional means, as for example by initially dissolving the polymeric residue in an organic solvent such as acetone, tetrahydrofuran, methanol, dichloromethane, ethyl acetate, etc., and then precipitating the polymer with a non-solvent such as hexane, cyclohexanol, diethyl ether, mesitylene or the like. Similarly, precipitation of the polymers may be accomplished by simply employing cold water. Recovery of the polymer is then accomplished by standard filtration and drying procedures.

Poly(vinyl acetate) produced in accordance with this invention has an intrinsic viscosity, and thus a corresponding molecular weight which is only slightly higher than reacetylated poly(vinyl acetate) produced from poly(vinyl alcohol) resulting from alcoholysis of the original poly(vinyl acetate). Thus, the poly(vinyl acetate) produced in accordance with this invention is essentially linear. Poly(vinyl acetate) produced in accordance with the process of this invention has an intrinsic viscosity which is equal to or greater than about 3.2 dL/g. This corresponds to a weight average molecular weight of equal to or greater than about $1.0 \times 10^6$. Thus, given the fact that the repeat unit of poly(vinyl acetate) has a molecular weight of about 86 and the repeat unito of poly(vinyl alcohol) has a molecular weight of about 44, poly(vinyl alcohol) produced (by the alcoholysis of such poly(vinyl acetate) has a weight average molecular weight of at least about $0.45 \times 10^6$. In the preferred embodiments of this invention, the poly(vinyl acetate) produced in accordance with the process of this invention will have an intrinsic viscosity ranging from about 3.5 dL/g to about 4.0 dL/g. Poly(vinyl acetate) falling within this intrinsic viscosity range has a weight average molecular weight ranging from about $1.3 \times 10^6$ to about $1.6 \times 10^6$, and poly(vinyl alcohol) pepared by the alcoholysis of this material will have a weight average molecular weight ranging from about $0.5 \times 10^6$ to about $0.8 \times 10^6$.

The determination of the weight average molecular weight of poly(vinyl acetate) may be accomplished by any one of a number of techniques known to those skilled in the art. Illustrative examples of suitable means for conducting the molecular weight determination include light scattering techniques which yield a weight average molecular weight and intrinsic viscosity determination which may be correlated to weight average molecular weight in accordance with the relationship $[\eta] = 5.1 \times 10^{-5} M^{0.791}$, described more fully by W. S. Park, et al. in the *Journal of Polymer Science*, Polymer Physics Ed., vol. 15, p. 81 (1977).

The second step of the process of this invention can be depicted schematically as follows:

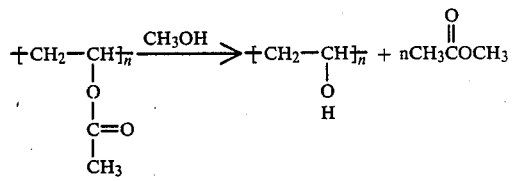

wherein n is as described above. Conventional procedures for the alcoholysis of poly(vinyl acetate) can be used to convert the poly(vinyl acetate) into poly(vinyl alcohol). Illustrative of such procedures are those described in detail in U.S. Pat. No. 4,463,138 which is incorporated herein by reference. Briefly stated, the alcoholysis of step 2 above may be accomplished by initially dissolving the poly(vinyl acetate) in a quantity of a low molecular weight alcohol such as methanol or ethanol sufficient to form at least about a 2% solution of the poly(vinyl acetate) resin Base or acid catalysis may then be employed in order to convert the poly(vinyl acetate) to poly(vinyl alcohol) which is produced in the form of a gel. Base catalysis is preferred, however, with suitable bases including potassium hydroxide, sodium hydroxide, sodium methoxide, potassium methoxide, etc. The gel material is then chopped into small pieces and extracted repeatedly with methanol, ethanol or water for removal of residual base salts. The essentially pure poly(vinyl alcohol) is then dried under vacuum at a temperature of about 30° C. to about 70° C. for about 2 to 20 hours. Poly(vinyl alcohol) produced in accordance with the process of this invention will have a weight average molecular weight of at least about $0.45 \times 10^6$. In the preferred embodiments, the weight average molecular weight of the poly(vinyl alcohol) is from about $0.45 \times 10^6$ to about $1.0 \times 10^6$ and in the particularly preferred embodiments is from about $0.5 \times 10^6$ to about $0.8 \times 10^6$.

Poly(vinyl alcohol) produced in accordance with this invention is useful in the production of poly(vinyl alcohol) fibers of excellent strength. Also, fibers produced from the poly(vinyl alcohol) of this invention have high melting points. Fibers produced from the high molecular weight poly(vinyl alcohol) of this invention and processes for their production are described more fully in commonly assigned U.S. Pat. No. 4,449,711. Accordingly, such procedures will not be described herein in detail.

The following examples are presented to more particularly illustrate the invention, and should not be construed as limitations thereon.

EXAMPLE I

A solution containing 3.1 mg of ABVN initiator, (2,2'-azobis-(2,4-dimethyl-4-methoxyvaleronitrile)), and 100 g of vinyl acetate was placed in a 500 mL 3-necked flask, fitted with a condenser and a gas dispersion tube. Nitrogen was introduced by bubbling through the solution for two hours in order to remove air from the system. The reaction mixture was kept at 21° C. for 18 hours under a blanket of nitrogen.

At the end of this period, the unreacted monomer was evaporated from the reaction mixture. Methanol was added to the residue and stirred. A sample of the solution was analyzed and found to have a molecular weight of $1.53 \times 10^6$. The methanolic solution was hydrolyzed in the presence of 1 g of potassium hydroxide which yielded 11.9 g (23.3% conversion) of poly(vinyl alcohol). A sample was reacetylated and found to have a molecular weight of $1.8 \times 10^6$. Thus, it showed that the original poly(vinyl acetate) was essentially linear.

A 7.5% of the poly(vinyl alcohol) in glycerol at 200° C. was gel spun into a fiber which was extracted with methanol and then drawn at 255° C. with an overall draw ratio of 6.9. The drawn fiber had a tensile strength of 14.2 gpf, ultimate elongation of 2.7%, and modulus of 630 gpd.

EXAMPLES II TO V

Using the procedure of Example I, vinyl acetate (VAM) was bulk polymerized in the presence of ABVN initiator to form poly(vinyl acetate), which was converted to poly(vinyl alcohol). The polymerization parameters, % conversion of poly(vinyl acetate) into poly(vinyl alcohol), and intrinsic viscosity and molecular weight of the poly(vinyl acetate) are set forth in the following Table I.

TABLE I

| Example No. | ABVN M × 10⁴ | Time (HR) | Temp. (°C.) | Conv. (%) | I.V. (dL/g) | MW (M × 10⁶) | VAM (g) |
|---|---|---|---|---|---|---|---|
| II | 1 | 18 | 21 | 23.3 | 3.93 | 1.53 | 100 |
| III | 1 | 18 | 23 | 27.8 | 4.06 | 1.60 | 50 |
| IV | 2 | 6 | 21 | 10.6 | 3.41 | 1.26 | 50 |
| V | 4 | 6 | 20 | 7.4 | 3.36 | 1.24 | 50 |

EXAMPLE VI

A solution containing 15.5 mg of (2,2'-azobis-(2,4-dimethyl-4-methoxyvaleronitrile) and 1000 g of vinyl acetate was stirred in a 3-necked 2-liter flask placed in a water bath at 20° C. During this period the solution was deaerated by bubbling nitrogen through a gas dispersion tube below the liquid surface for an hour. The dispersion tube was then raised above the liquid surface so that the reaction mixture was blanketed by nitrogen throughout the entire polymerization period.

After 18 hours, 1 g of p-methoxyphenol was added. The unreacted vinyl acetate was distilled from the reaction mixture in a vacuum at about 50° C. The polymeric residue was dissolved in about 3 liters of methanol at about 50° C. A sample of the methanolic solution was taken for analysis. The intrinsic viscosity of the polymer in tetrahydrofuran was found to be 3.72 dL/g. The weight average molecular weight calculated from the intrinsic viscosity was $1.40 \times 10^6$.

The methanolic solution of poly(vinyl acetate) was stirred in the presence of 4 g of potassium hydroxide at room temperature for about 2 hours. A gel formed which was chopped up in a blender and washed twice with methanol. The solids were filtered and dried in a vacuum oven at 50° C. The poly(vinyl alcohol) thus obtained weighed 59.4 g. The conversion was about 11.5%.

EXAMPLES VII TO XV

Using the procedure of Example VI, vinyl acetate (VAM) was bulk polymerized in the presence of 2,2'-azobis-(2,4-dimethyl-4-methoxy-valeronitrie) (ABVN) to form poly(vinyl acetate), which was converted to poly(vinyl alcohol).

The polymerization parameters, % conversion of the poly(vinyl acetate) into poly(vinyl alcohol), and intrinsic viscosity and molecular weight of the poly(vinyl acetate) are set forth in the following Table II.

TABLE II

| Example No. | ABVN M × 10⁴ | Time (HR) | Temp. (°C.) | Conv. (%) | I.V. (dL/g) | MW (M × 10⁶) | VAM (g) |
|---|---|---|---|---|---|---|---|
| VII | 0.5 | 18 | 20 | 11.5 | 3.72 | 1.40 | 500 |
| VIII | 0.9 | 18 | 15 | 4.3 | 3.61 | 1.35 | 500 |
| IX | 1 | 6 | 20 | 3.4 | 3.49 | 1.30 | 500 |
| X | 1 | 18 | 20 | 11.7 | 3.57 | 1.33 | 500 |
| XI | 1 | 18 | 20 | 16.5 | 3.74 | 1.41 | 500 |
| XII | 0.25 | 18 | 20 | 3.9 | 3.57 | 1.33 | 1000 |
| XIII | 0.5 | 18 | 20 | 11.5 | 3.72 | 1.40 | 1000 |
| XIV | 0.5 | 18 | 20 | 10.4 | 3.67 | 1.38 | 1000 |
| XV | 4 | 6 | 20 | 10.3 | 3.43 | 1.27 | 1000 |
| XVI | 0.5 | 18 | 20 | 16.6 | 3.73 | 1.41 | 1000 |

What is claimed is:

1. A bulk polymerization process for producing poly(vinylacetate) which comprises polymerizing vinyl acetate essentially in the absence of ionizing radiation at a temperature in the range of from about 0° to about 40° C., and in the presence of from about $1 \times 10^{-6}$ to about $1 \times 10^{-3}$ mole percent of an initiator based on the total moles of vinyl acetate monomer, said initiator of the formula:

$$R_1-N=N-R_2$$

wherein: $R_1$ and $R_2$ are the same or different and are straight or branched chain lower alkyl, lower alkoxyalkyl, cycloalkyl, nitrile substituted alkyl, or phenylalkylnitrile, for a time sufficient to provide essentially linear poly(vinylacetate) having an average molecular weight of at least about $1.0 \times 10^6$.

2. A process according to claim 1 wherein said process further comprises hydrolyzing said poly(vinyl acetate) to provide the corresponding poly(vinyl alcohol), which upon acetylation provides a poly(vinyl acetate) having an intrinsic viscosity of at least about 3.3 dL/g.

3. A process according to claim 1 wherein said process is carried out at a temperature of from about 10° C. to about 35° C.

4. A process according to claim 3 wherein said process is carried out at a temperature of from about 15° C. to about 30° C.

5. A process according to claim 1 wherein said effective initiator is an azo compound having a half life of up to about 200 h at a temperature of from about 0° C. to about 40° C.

6. A process according to claim 5 wherein said effective initiator is an azo compound having a half life of from about 1 h to about 200 h at a temperature of from about 0° C. at about 40° C.

7. A process according to claim 6 wherein said initiator is an azo compound having a half life of from about 10 to about 150 h at a temperature of from about 10° C. to about 35° C.

8. A process according to claim 7 wherein said initiator is an azo compound having a half life of from about 50 to about 100 hours at a temperature of from about 15° C. to about 30° C.

9. A process according to claim 1 wherein said initiator is 2,2-azobis-(2,4-dimethyl-4-methoxyvaleronitrile.

10. A process according to claim 1 wherein the concentration of said initiator is from about $1 \times 10^{-6}$ to about $1 \times 10^{-3}$ mole percent based on the total moles of vinyl acetate monomer.

11. A process according to claim 1 wherein said mole percent is from about $1 \times 10^{-5}$ to about $1 \times 10^{-3}$.

12. A process according to claim 11 wherein said mole percent is from about $2 \times 10^{-5}$ to about $2 \times 10^{-4}$.

13. A process according to claim 12 wherein said mole percent is from about $5 \times 10^{-5}$ to about $5 \times 10^{-4}$.

14. A process according to claim 4 wherein said polymerization is carried out for a time period of from about 2 to about 48 hours.

15. A process according to claim 14 wherein said time period is from about 4 to about 36 hr.

16. A process according to claim 15 wherein said time period is from about 6 to about 24 hr.

17. A process according to claim 16 wherein said time period is from about 6 to about 18 hours.

18. A bulk polymerization process for producing high molecular weight poly(vinyl alcohol) which comprises the steps of:
    (a) polymerizing vinyl acetate monomer essentially in the absence of ionizing radiation at a temperature in the range of from about 0° C. to about 40° C. in the presence of from about $1 \times 10^{-6}$ to about $1 \times 10^{-3}$ mole percent of an initiator based on the total moles of vinyl acetate monomer, said initiator of the formula:

$$R_1-N=N-R_2$$

wherein: $R_1$ and $R_2$ are the same or different and are straight or branched chain lower alkyl, lower alkoxyalkyl, cycloalkyl, nitrite substituted alkyl or phenylalkyl, for a time sufficient to provide an essentially linear poly (vinyl acetate) having a weight average molecular weight of at least about $1.0 \times 10^6$; and
    (b) subjecting said poly(vinyl acetate) to alcoholysis or hydrolysis to provide the corresponding poly(vinyl alcohol) having a weight average molecular weight of at least about $0.4 \times 10^6$.

19. A process according to claim 18 wherein the weight average molecular weight of said poly(vinyl acetate) is from about $1.3 \times 10^6$ to about $1.6 \times 10^6$, and the weight average molecular weight of said corresponding poly(vinyl alcohol) is from about $0.5 \times 10^6$ to about $0.8 \times 10^6$.

* * * * *